Patented June 12, 1945

2,378,364

UNITED STATES PATENT OFFICE 2,378,364

BATAVIA DAMMAR RESIN COATING COMPOSITIONS

Robert C. Swain, Riverside, and Pierrepont Adams, Stamford, Conn., assignors to American Cyanamid Company, New York, N. Y., a corporation of Maine No Drawing. Application October 26, 1940, Serial No. 363,003

4 Claims. (Cl. 260—24)

This invention relates to coating compositions containing Batavia dammar resin and melamine-formaldehyde resins.

An object of this invention is to improve the physical and chemical properties of melamine-formaldehyde resin compositions, e. g., adhesion, hydrocarbon tolerance, etc.

Another object of this invention is to provide compositions containing Batavia dammar resin and compatible proportions of compatible melamine-formaldehyde resins.

These and other objects are attained by blending Batavia dammar resin with a melamine-formaldehyde resin which has been alkylated with an acyclic alcohol containing at least 4 carbon atoms wherein the molal ratio of formaldehyde to melamine is at least about 4:1.

The following examples in which the proportions are in parts by weight are given by way of illustration and not in limitation.

Example 1

| | Parts |
|---|---|
| Melamine-formaldehyde resin "A" | 10 |
| Batavia dammar | 90 |

A composition containing these ingredients is prepared by admixing 20 parts of melamine-formaldehyde resin "A" solution (50% resin) with 360 parts of "Batavia dammar stock solution" (containing 25% of Batavia dammar and 75% of toluene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "A" | 90 |
| Batavia dammar | 10 |

A composition containing these ingredients is prepared by admixing 180 parts of melamine-formaldehyde resin "A" solution (50% resin) with 40 parts of "Batavia dammar stock solution." Films of the composition are applied to metal objects and baked at a temperature of about 135° C. for about one-half hour. A water-white film is produced.

Example 3

| | Parts |
|---|---|
| Melamine-formaldehyde resin "B" | 25 |
| Batavia dammar | 75 |

A composition containing these ingredients is prepared by admixing 50 parts of melamine-formaldehyde resin "B" solution (50% resin) with 300 parts of "Batavia dammar stock solution." Films of the composition are applied to metal objects and baked at a temperature of about 135° C. for about one-half hour. A water-white film having good chemical properties is formed.

Example 4

| | Parts |
|---|---|
| Melamine-formaldehyde resin "B" | 75 |
| Batavia dammar | 25 |

A composition containing these ingredients is prepared by admixing 150 parts of melamine-formaldehyde resin "B" solution (50% resin) with 100 parts of "Batavia dammar stock solution." Films of the composition are applied to metal objects and baked at a temperature of about 135° C. for about one-half hour. A clear, tough film is formed.

Example 5

| | Parts |
|---|---|
| Melamine-formaldehyde resin "C" | 50 |
| Batavia dammar | 50 |

A composition containing these ingredients is prepared by admixing 100 parts of melamine-formaldehyde resin "C" solution (50% resin) with 200 parts of "Batavia dammar stock solution." Films of the composition are applied to metal objects and baked at a temperature of about 135° C. for about one-half hour. The product is a clear, water-white film which is extremely mar-resistant.

Example 6

| | Parts |
|---|---|
| Melamine-formaldehyde resin "D" | 90 |
| Batavia dammar | 10 |

A composition containing these ingredients is prepared by admixing 180 parts of melamine-formaldehyde resin "D" solution (50% resin) with 40 parts of "Batavia dammar stock solution." Films of the composition are applied to metal objects and baked at a temperature of about 135° C. for about one-half hour. The product formed is a very hard, clear coating.

Example 7

| | Parts |
|---|---|
| Melamine-formaldehyde resin "E" | 10 |
| Batavia dammar | 90 |

A composition containing these ingredients is prepared by admixing 20 parts of melamine-formaldehyde resin "E" solution (50% resin) with 360 parts of "Batavia dammar stock solution." Films of the composition are applied to metal objects and baked at a temperature of about 135° C. for about one-half hour. The product is a transparent, resistant coating.

*Example 8*

| | Parts |
|---|---|
| Melamine-formaldehyde resin "F" | 25 |
| Batavia dammar | 75 |

A composition containing these ingredients is prepared by admixing 50 parts of melamine-formaldehyde resin "F" solution (50% resin) with 300 parts of "Batavia dammar stock solution." Films of the composition are applied to metal objects and baked at a temperature of about 135° C. for about one-half hour. A film having good chemical properties is formed.

*Example 9*

| | Parts |
|---|---|
| Melamine-formaldehyde resin "F" | 75 |
| Batavia dammar | 25 |

A composition containing these ingredients is prepared by admixing 150 parts of melamine-formaldehyde resin "F" solution (50% resin) with 100 parts of "Batavia dammar stock solution." Films of the composition are applied to metal objects and baked at a temperature of about 135° C. for about one-half hour. A hard, transparent film is produced.

*Example 10*

| | Parts |
|---|---|
| Melamine-formaldehyde resin "G" | 50 |
| Batavia dammar | 50 |

A composition containing these ingredients is prepared by admixing 100 parts of melamine-formaldehyde resin "G" solution (50% resin) with 200 parts of "Batavia dammar stock solution." Films of the composition are applied to metal objects and baked at a temperature of about 135° C. for about one-half hour, to give a smooth, transparent surface.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "D"*

| | Parts |
|---|---|
| Melamine-formaldehyde (molal ratio 1:4) spray-dried powder | 300 |
| n-Propanol | 1200 |
| Methyl acid phosphate | 3 |

The melamine-formaldehyde condensation product is obtained by refluxing melamine and formalin (37% formaldehyde in water) in the molal ratio of 1:4 at a pH of about 7–9 for about 3 hours and then spray-drying.

The spray-dried melamine-formaldehyde powder, propanol and methyl acid phosphate are heated to about 90° C. in 40 minutes and refluxed about 30 minutes. This solution is vacuum concentrated at about 50–60° C. until 767 parts of volatile material are distilled off. The resin solution thus formed contains about 48% solids.

*Preparation of melamine-formaldehyde resin "E"*

| | Parts |
|---|---|
| Melamine | 283 |
| Formalin (37% formaldehyde in water) | 978 |

This mixture is heated at about 70–80° C. until a homogeneous solution is obtained. The pH is adjusted to about 7.3 with caustic and vacuum concentrated to remove about 50–70% of the free water. Sufficient phosphoric acid is added to neutralize the caustic present and then 320 parts of methanol are added. Wet methanol is gradually distilled off from the mixture and dry methanol is added at about the same rate as wet methanol is distilled off. This distillation and addition of methanol is continued until the distillate is substantially dry methanol. During this operation which requires about 4 hours, about 1600 parts of methanol are added. 707 parts of "Pentasol" (trade name of Sharples Solvents Corporation for mixed amyl alcohols) are added and the distillation is continued until the vapor temperature rises to about 100–105° C. About 710 parts of the distillate are collected. The pressure is lowered sufficiently to reduce the temperature to 80–90° C. and 178 parts more of the distillate are collected, leaving as a product a resin solution containing 50% of resin solids in "Pentasol."

*Preparation of melamine-formaldehyde resin "F"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "G"*

| | Parts |
|---|---|
| Melamine-formaldehyde (molal ratio 1:4) spray-dried powder | 200 |
| 2-ethyl hexanol | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7–9 for about 3 hours and then spray-drying.

The spray-dried melamine-formaldehyde powder, octanol, butanol and methyl acid phosphate are heated to about 100–105° C. in 30 minutes and refluxed about 30 minutes. This solution is vacuum concentrated at about 50–70° C. to form a product containing about 50% solids.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, hexyl alcohols and the octanols, a low boiling alcohol such as methanol or butanol may be mixed with the octanol, thereby assisting in removing the water and causing the reaction to take place readily at somewhat lower temperatures than would otherwise be required. The low boiling alcohol is removed by distillation after the reaction is completed. Another method for producing resins alkylated with octanols is to alkylate the melamine-formaldehyde resin with a low boiling alcohol such as methanol and subsequently replacing it with the desired octanol, distilling out the low boiling alcohol. The condensation may be carried out either with or without an acid catalyst and in some instances basic catalysts may desirably be utilized.

The melamine-formaldehyde resins vary slightly according to minor variations of control during their production and in some instances small proportions of a suitable solvent material, e. g., benzene, xylene, toluene, carbon tetrachloride, amyl acetate, etc., may be added to the original solutions of Batavia dammar resin and melamine-formaldehyde resin in order to produce perfectly clear solutions if such solutions are not originally obtained.

While formaldehyde has been used in the previous examples, it will be obvious that other aldehydes such as various polymers of formaldehyde, e. g., paraformaldehyde, or substances which yield formaldehyde may be used in place of part or all of the formaldehyde.

Melamine resins suitable for use according to our invention may be alkylated with acyclic straight and branched chain aliphatic alcohols containing at least 4 carbon atoms. Obviously various mixtures of alcohols may be used. The term "alkylated melamine-formaldehyde resin" is intended to denote compositions which are reacted with an alcohol.

In some instances melamine-formaldehyde resins alkylated with other alcohols have been found to be compatible with Batavia dammar resin in certain proportions. For example, up to about 25% of benzylated melamine-formaldehyde resins wherein the molal ratio of formaldehyde to melamine is about 5:1 are compatible with Batavia dammar resin. On the other hand, propylated melamine-formaldehyde resins wherein the molal ratio of formaldehyde to melamine is at least about 4:1 are compatible with at least about 50% of the Batavia dammar resin. At least about 75% of a melamine-formaldehyde resin alkylated with ethylene chlorohydrin wherein the molal ratio of formaldehyde to melamine is about 5.5:1 is compatible with Batavia dammar resin. Furthermore, about 10% of butylated melamine-formaldehyde resin wherein the molal ratio of formaldehyde to melamine is about 3:1 is compatible with Batavia dammar resin. Higher proportions of this same melamine resin up to 90% are partially compatible with Batavia dammar resin. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. The percentage composition in each instance in this paragraph is on a total solids weight basis.

Our compositions may be used in admixture with other resinous compositions, e. g., urea-formaldehyde resins, phenol-formaldehyde resins, ester gum, chlorinated rubbers, alkyd resins, modified alkyd resins such as the terpene-maleic acid-polyhydric alcohol resins, etc. They may also be used in drying oil vehicles such as linseed oil and the like, especially in combination with soluble phenol-formaldehyde resin materials.

A wide variety of plasticizers may be incorporated into our products such as the alkyl phthalates, tricresyl phosphate, alkyd resins, etc.

Various fillers, pigments, dyes and lakes may be added to our compositions, e. g., lithopone, zinc oxide, titanium oxide, ferric oxide, Prussian blue, toluidine red, malachite green, mica, ground glass, glass fibers, powdered silica, etc.

Curing catalysts may be incorporated into the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Our compositions containing melamine-formaldehyde resin and Batavia dammar resin are especially useful in coating compositions which must meet high specifications for alkali resistance, water resistance, etc. They also are quite tough and the original solutions have a high tolerance for hydrocarbons. Our compositions are especially useful in varnishes, lacquers, paints, enamels, etc., as well as in adhesives, in the production of printing inks, in treating paper and cloth, etc. The melamine-formaldehyde resins impart chemical resistance to the compositions whereas the Batavia dammar resin provides increased toughness, hydrocarbon tolerance, adhesive properties, etc.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing Batavia dammar resin and a melamine-formaldehyde resin which has been reacted with an aliphatic acyclic alcohol containing at least 4 carbon atoms and wherein the molal ratio of formaldehyde to melamine is at least about 4:1.

2. A coating composition containing Batavia dammar resin and a melamine-formaldehyde resin which has been reacted with n-butanol and wherein the molal ratio of formaldehyde to melamine is at least about 4:1.

3. A coating composition containing Batavia dammar resin and a melamine-formaldehyde resin which has been reacted with n-hexanol and wherein the molal ratio of formaldehyde to melamine is at least about 4:1.

4. A coating composition containing Batavia dammar resin and a melamine-formaldehyde resin which has been reacted with 2-ethyl hexanol and wherein the molal ratio of formaldehyde to melamine is at least about 4:1.

ROBERT C. SWAIN.
PIERREPONT ADAMS.